United States Patent
Jain et al.

(10) Patent No.: US 11,947,657 B2
(45) Date of Patent: Apr. 2, 2024

(54) PERSISTENT SOURCE VALUES FOR ASSUMED ALTERNATIVE IDENTITIES

(71) Applicant: Amazon Technologies, Inc., Seattle, WA (US)

(72) Inventors: Rachit Jain, Bothell, WA (US); Douglas Spencer Hewitt, Seattle, WA (US); Conor P Cahill, Waterford, WA (US); Ogbeide Derrick Oigiagbe, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 426 days.

(21) Appl. No.: 17/108,854

(22) Filed: Dec. 1, 2020

(65) Prior Publication Data
US 2022/0171842 A1    Jun. 2, 2022

(51) Int. Cl.
*G06F 21/45* (2013.01)
*H04L 9/40* (2022.01)

(52) U.S. Cl.
CPC .......... *G06F 21/45* (2013.01); *H04L 63/0884* (2013.01); *H04L 63/102* (2013.01); *H04L 63/20* (2013.01)

(58) Field of Classification Search
CPC ... G06F 21/45; H04L 63/0884; H04L 63/102; H04L 63/20; H04L 63/0414; H04L 61/3015
See application file for complete search history.

(56) References Cited

U.S. PATENT DOCUMENTS

| 7,770,204 B2 | 8/2010 | Pathakis et al. |
| 2005/0071687 A1* | 3/2005 | Pathakis ............. H04L 63/0407 726/19 |
| 2019/0051181 A1* | 2/2019 | Lin ........................ H04L 65/40 |

FOREIGN PATENT DOCUMENTS

| JP | 2007148903 A | 6/2007 |
| WO | 2013151752 A1 | 10/2013 |

OTHER PUBLICATIONS

Invitation to Pay Additional Fees and, Where Applicable, Protest Fee with Search Report dated Mar. 11, 2022 in International Patent Application No. PCT/US2021/061314.
(Continued)

*Primary Examiner* — Baotran N To
(74) *Attorney, Agent, or Firm* — Robert C. Kowert; Kowert, Hood, Munyon, Rankin & Goetzel, P.C.

(57) ABSTRACT

An Identity and Access Management Service implements persistent source values PSVs) for assumed identities. A source value (e.g., an original identifier of an entity) is persisted across assumed identities, facilitating identification of entities (users or applications) responsible for actions taken by the assumed (e.g., alternative) identities. The Manager receives a request to assume an identity. The request includes the entities current credentials and a PSV. The current credentials are authenticated and a persistent source value policy may be relied on to determine whether and/or how to grant the assumed identity. The PSV may be copied from credentials in the request in order to be included in the credentials for the requested identity that the Manager provides in response to the request. Use of the requested credentials, including the PSV, to access services or resources may be logged, the logs including the PSV from the request to assume the identity.

20 Claims, 7 Drawing Sheets

(56) References Cited

OTHER PUBLICATIONS

Derrick Oigiagbe, "Easily control the naming of individual IAM role sessions", AWS Security Blog, Retrieved from https://aws.amazon.com/blogs/security/easily-control-naming-individual-iam-role-sessions/ on Nov. 12, 2020, pp. 1-10.

International Search Report and Written Opinion dated Jun. 1, 2022 in International Application No. PCT/US2021/061314, Amazon Technologies, Inc., pp. 1-21.

\* cited by examiner

| Alternative Identity Identifier | AltDev123 | AltSvcxyz | TempUserxyz | TempSvcabc | TempIT234 |
|---|---|---|---|---|---|
| Policy Name | PSV_Dev_Policy | PSV_Serv_Policy | PSV_Cust_Policy | PSV_Read_policy | PSV_Admin_policy |
| Target | DatabaseService | StorageResource xyz | StorageService | ComputeService | ComputeService |
| Permissions | Read/Write | Write | ReadOnly | Instantiate | Full |
| Value for permissions based on persistent source value | | | Read/Write for PSV "RoyG44" | | PSV must be in format: "username-TroubleTicketNo." |
| Other Permission Statements [not based on persistent source value] | Read/Write Limited to Dev_Database | Cannot Assume Other Identities From This Role | | | |
| Persistent Source Value | Required | Optional | Required: Must use username field | Required | Required |
| Duration | 4 hours | 24 hours | 30 minutes | 30 minutes | 30 minutes |

FIG. 4

PERSISTENT SOURCE VALUES FOR ASSUMED ALTERNATIVE IDENTITIES

BACKGROUND

Identity and access management may include a framework of policies and technologies for ensuring that various client entities have appropriate access to technology resources. For example, identity and access management systems not only identify, authenticate, and authorize entities that utilize computing resources but also the hardware and applications employees need to access. Identity and access management solutions have become more prevalent and critical in recent years as regulatory compliance requirements have become increasingly more rigorous and complex. Identity and access management addresses the need to ensure appropriate access to resources across increasingly heterogeneous technology environments. Identity-management systems, products and applications manage identifying and ancillary data about entities that include individuals, computer-related hardware, and software applications in some such heterogeneous systems.

Identity management may address issues such as how clients (sometimes referred to as users or programmatic applications, herein) gain an identity, and assume alternative identities (sometimes referred to herein as temporary identities, a temporary assumption of an alternative identity), and in some instances, the permissions that identity grants, as well as the protection of that identity and the technologies supporting that protection (e.g., network protocols, digital certificates, passwords, etc.).

As systems do not automate tracking of long-term identities across numerous assumed temporary identities, it is difficult to determine responsibility for actions performed using multiple assumed temporary identities, especially across multiple domains wherein different domains are prevented from viewing logs of other domains. Making such determinations can require complex, custom applications that compare chains of identifiers of identities across numerous various logs (e.g., to identify the entity that assumed a temporary identity and performed a particular action) of numerous various domains. For example, it may be necessary to uncover an entire chain of temporary identities to trace an action back to the long-term identity responsible for the action. Uncovering the original source for an entity that has assumed roles across accounts may not be possible because access to logs for the other accounts are not permitted.

BRIEF DESCRIPTION OF THE DRAWINGS

FIG. 4 is a table illustrating various characteristics of persistent source value policies for a system that implements persistent source values for assumed alternative identities, according to some embodiments.

Figure 1:
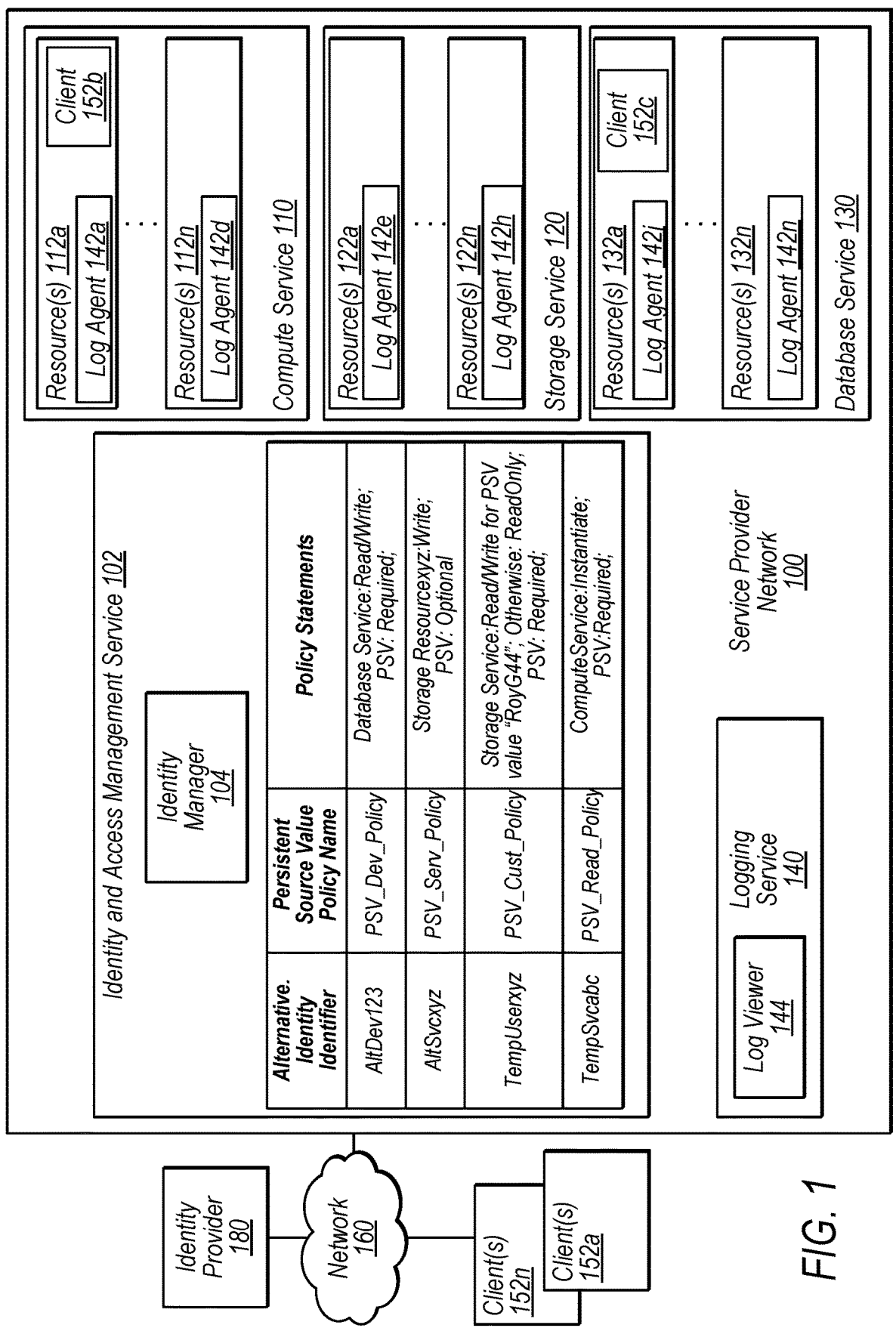
FIG. 1 is a block diagram that illustrates components of a system that implements persistent source values for assumed alternative identities, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, various embodiments of systems that implement an Identity and Access Management Service that implements persistent source values for assumed alternative identities are disclosed. In embodiments, the disclosed capability facilitates tracking (e.g., logging or the like) of an original source value (e.g., an identifier of a service entity or user entity) for actions performed by one or more alternative identities (sometimes referred to herein as temporary identities, a temporary assumption of an alternative identity) that the entity has assumed. Entity is intended broadly and may include, users, principals, client devices, client applications, services (e.g., programmatic clients), servers, and the like. In some embodiments, "temporary" may refer to a duration for the assumption of the identity, rather than a duration of the existence or availability of the identity within the system.

In some systems, when an entity assumes an alternative (or temporary) identity, logging software that logs actions of resources that are targets of actions by the alternative identity log the alternative identity, not the long-term (or "original") identity of the entity that assumed the alternative identity. In such systems, it can be difficult to track the actions performed by an alternative identity back to the long-term, original, identity.

In contrast, for at least some embodiments described herein, a system may enforce or require definition of a persistent source value at the time of assumption of an alternative identity, even across assumption of numerous alternative identities in a same session. The persistent source value may be persisted across assumption of numerous alternative identities (or across roles, a type of identity in some systems) and logged when any of the assumed alternative identities performs an action. For example, failed or successful access requests at resources may be logged, and/or requests to assume alternative identities may be logged, as well. In embodiments, the existence of the persistent source value in credentials of the last of a chain of numerous alternative identities for a session may make it unnecessary to investigate and uncover the entire chain of alternative identities to trace an action back to the long-term identity ultimately responsible for the action. In embodiments, the persistent source value in credentials of the last alternative identity would be the long-term identity (e.g., the original identity) responsible for the action. In an example use, logs recording the actions and the persistent source value (e.g., from the credentials) of requests made to resources may be viewed or queried to identify responsibility for an action performed with an alternative identity in a customer's account (e.g., without having to trace back the entire chain to the original identity associated with the entity).

In embodiments, the persistent source value acts as a tracer through the assumed identities and logging system that retains the source value through multiple assumptions such that it is not necessary to recreate or discover the entire chain of identities in order to determine the original responsible entity for an action.

Although embodiments herein describe use of a persistent source value for persisting an identifier for an original identity of an entity across assumed identities (e.g., a username of a long-term credential or similar) it is contemplated that the persistent source value may be used to persist other values, such as, but not limited to, trouble tickets, project names, etc.

In some embodiments, an identifier associated with one set of credentials for a first identity (a long-term or a temporary identity) is persisted as subsequent identities (e.g., subsequent temporary identities) are assumed. In embodiments, credentials that are part of or are associated with a user identity are intended broadly and non-exhaustive examples of credentials include a password, access key, server certificate, various other identifiers such as sessions keys, etc., without limitation).

In embodiments, the persistent source value may or may not be a required request parameter when assuming a temporary identity (e.g., a persistent source value policy or the like may specify the requirement). For example, an administrator can configure the system (e.g., via a policy) to require requesting entities (programmatic or users) to define their persistent source value when assuming a temporary identity in the account. Entities that do not provide a required persistent source value in accordance with the policy may be prevented from assuming the corresponding temporary identity, and the failed identity assumption may be logged (e.g., by a logging agent at the Identity Manager) in embodiments.

In embodiments, the identifier that is persisted may be referred to as a persistent source value. In embodiments, the persistent source value is a unique identifier that a long-term identity or application sets as an attribute when assuming a temporary identity. In embodiments, a persistent source value attribute accepts strings as its value, such as, but not limited to, a passphrase or a policy variable, etc.

In some systems, a specialized type of identity, sometimes referred to as a role, is an identity, associated with an account, that has specific permissions. For example, a role may have an identity with permission policies that determine what the identity can and cannot do in the system. However, instead of being uniquely associated with one person, a role may be intended to be assumable by anyone who needs it. Also, in some embodiments, a role does not have standard long-term credentials such as a password or access keys associated with it. Instead, when a role is assumed, it provides temporary security credentials for the role session.

Some systems may implement a RoleSessionName condition element, distinct from the persistent source value herein. In some systems a RoleSessionName condition facilitates control of naming of individual identity (or role) sessions. For example, each instantiation of an alternative identity, and the associated set of credentials (e.g., short-term credentials), may be known as a role session. In the example, a role session is uniquely identified by a role session name. The RoleSessionName condition element may be used to control how entities (e.g., users and applications) name their role sessions when they assume an identity. Such a RoleSessionName condition is distinct from the persistent source value described herein, at least in that the RoleSessionName condition is not persisted across identity assumptions; it only exists for the duration of the session associated with the current identity. In contrast, the persistent source value is transitive, sticky, and gets logged by logging agents located at target resources, in embodiments.

The persistent source value may be persisted across assumed identities as a persistent identifier (e.g., an attribute or field) maintained in credentials (e.g., tokens or the like) provided for the assumed identities, for example. Some embodiments herein describe the persistent source value as an identifier of an originating entity or client (e.g., sometimes referred to as a persistent source identifier for the entity). However, the persistent source value may be construed broadly. The persistent source value may identify a particular trouble ticket (or task) for an IT service, or may identify a particular programmatic process running on a network, or may identify particular projects of an organization, as a few non-exhaustive examples.

In one example, an identity manager component of a system or identity service may receive a request to assume a temporary identity. The request may originate from a client (e.g., a user's device running client software, or a programmatic process (application) acting as a client). The request presents first credentials associated with a first identity of the entity making the request. The service authenticates the first credentials associated with a first identity and for valid credentials, grants the request (determination of whether to grant the request may be further specified in permissions of a policy in embodiments) and embeds a persistent source value in the second credentials (the second credentials are the credentials for the requested temporary identity).

In embodiments, if additional identities are assumed by the entity, the persistent source value is persisted across the additional assumed entities. The value for the persistent source value that is persisted may originate from various sources, including but not limited to, the request (e.g., the username provided in the request, a field provided by a user via CLI, API, or GUI), or a field or attribute specified by a persistent source value policy, etc. In embodiments, the persistent source value is a mechanism that persists some value from the initial use of the long-term identity and long-term credentials (e.g., prior to obtaining the temporary identity/credentials) across one or more uses of assumed temporary identities and credentials. In embodiments, the phrases long-term and temporary are relative terms. For example, long-term credentials may have a lifetime that is longer (significantly longer in embodiments) than temporary credentials. Temporary identities and/or credentials may be associated with relatively short lifetimes and have an earlier expiration than long-term credentials which have a later expiration, in embodiments. Long-term and short-term identities and/or credentials may be renewable, in embodiments. An entities identity may return or revert back to a long-term identity when an assumed temporary identity session expires, in embodiments. Upon expiration of a temporary identity session, an entity may be required to authenticate long-term credentials, in embodiments.

In embodiments, when the assumed alternative identity is used, a logging agent will log the activity performed by the assumed identity (e.g., generate a log including the persistent source value and information about the activity). When the logs are viewed, the persistent source value facilitates tracking of the entity performing the action, even though the entity was acting with an assumed (e.g., temporary) identity. For example, in the case where an entity sets the persistent source value to the entities username of the entities long-term credentials when assuming temporary identity, a logging service will log any activity performed by the temporary identity and an administrator can rely on the username persisted in the persistent source value when viewing associated logs to identify the entity responsible for the action performed with the temporary identity. In embodiments, the Identity and Access Management Service will also maintain the persistent source value (e.g., source identity information), when a temporary identity is used to assume another temporary identity in the existing session, to carry out actions.

Non-exhaustive examples of some the benefits of maintaining source identity for assumed identities include facilitating identification of the entity responsible for an action performed with an assumed identity (e.g., not performed using the original identity for the entity). For example, an administrator may request that all entities in their company set their username (or other identifier) as their source identity when assuming another identity. In a particular example, activity performed by a first assumed identity may be logged (e.g., the source identity may be passed along with the credentials or token for the first assumed identity and logged upon receipt of requests by a target resource) and the administrator can rely on the source identity when viewing the logs, to identify the entity responsible for the action performed with the assumed identity. In some embodiments, the system may maintain the persistent source value even when the identity assumes yet another identity in the existing session, to carry out actions.

Descriptions of various figures is now presented. Generally, components depicted in FIGS. 1 and 8 may perform at least some of the functionality depicted in FIGS. 2A/2B-6 and the table illustrated in FIG. 4 provides examples of policies that may be implemented by the system and components illustrated in FIGS. 1 and 8, and relied on by functionality depicted in FIGS. 2A/2B-3, and 5, in some embodiments. For example, the identity assumption processes and components depicted in FIGS. 2A/2B are performed by similar components in FIG. 1 and the identity assumption process illustrated in FIG. 3 may be performed by the Identity and Access Management Service 102 in FIGS. 1, 2A/2B. The access request process illustrated in FIG. 5 may be performed by a resource 112, 122 or 132 of services 110, 120 or 130 of FIG. 1, in embodiments. The log processing process depicted in FIG. 6 may be performed by one or more components of the logging service 140 in FIG. 1, in embodiments.

FIG. 1 is a block diagram that illustrates components of a system that implements persistent source values for assumed alternative identities, according to some embodiments. Various of the illustrated components may perform functionality depicted in FIGS. 2A/2B-3, and 5-6. For example, Identity and Access Management Service is illustrated with Identity Manager 104 and a table of mappings of Alternative Identity Identifiers to Persistent Source Value Policies (e.g., policies are illustrated in FIG. 4, described below).

In embodiments, a policy is an object that, when associated with an identity or resource, defines their permissions. A component of the system evaluates these policies when entity (user or programmatic) uses an identity to make a request. A system (a service provider network or other type of system) may implement various types of policies (e.g., identity-based policies, resource-based policies, access control lists, session policies, etc.). Different types and various numbers of policies may be associated with identities or resources, for example. A system may provide an interface (command-line interface—CLI, application program interface—API, graphic interface—GUI, etc. for accessing, creating, configuring and/or managing the various types of policies. The persistent source value policies illustrated in FIGS. 1 and 4, described below, are an example type of numerous types of policies.

In some embodiments, clients (e.g., external client(s) 152($a, n$) or internal clients 152$b/c$) having long-term identities and associated long-term credentials) send requests (e.g., access requests—which is intended broadly and includes, but is not limited to, storage requests, data retrieval requests, processing requests, update requests, or the like) to resources (112$a$-$n$, 122$a$-$n$, and/or 132$a$-$n$) of services (Compute Service 110, Storage Service 120, and/or Database Service 130). In embodiments, the services include, but are not limited to, services (e.g. network-based services) of a service provider network 100 that provide compute power, storage, content delivery, or other functionality, such as various application built from the compute and storage resources. The services may include technical infrastructure and distributed computing building blocks and tools, arranged in various architectures for other services that may be accessed via the requests described herein, in embodiments. The resources of the various services process the requests and provide responses to the requests.

Clients 152$a, b, c, \ldots n$ may send requests to the services 110-130 using their long-term credentials, or may assume temporary credentials and then send requests to the services 110-130 using the temporary credentials instead. For example, internal client 152$b$ (e.g., an application running on or across one or more resources of one or more services 110-130) may interact with the Identity Manager 104 of Identity and Access Management Service 102 to request an alternative identity associated with alternative credentials and then if the alternative identity is successfully obtained, use the alternative credentials to send requests to other resources of services 110-130. Similarly, an external client 152$a$ may provide long-term credentials from an external identity provider 180 (e.g., a third-party identity provider or an identity provider on a client network) in a request to Identity Manager 104 to assume an alternative identity and then use those alternative credentials to access services 110-130. As describe herein, a persistent source value, determined at the time of identity assumption, may persist across the assumed credentials. The persisted value may be provided in the requests to the services 110, 120, 130 and logged (e.g., logged by local agents on the resources) in order to track source information about the request (e.g., to track the original long-term identity that assumed the alternative identity that made the request).

In embodiments, when resources 112, 122, 132 process the requests, logging agents 142$a$-$n$ may log information associated with the requests. For example, the logging agents may log the alternative identity identifier (e.g., a name of the alternative identity) and the persistent source value and other information about the request. A log viewer 144 of Logging Service 140 may provide access to the logs, to determine the persistent source value associated with the request, for example.

Persistent source value policies are illustrated in the Identity and Access Management Service 102 of FIG. 1. For a given identity (such as an alternative identity identified by an identity identifier, illustrated in FIG. 1 as TempDev123, TempSvcxyz, etc.) policies for that identity may or may not require presence of a persistent source value. A policy (e.g., a persistent source value policy, such as those illustrated in FIGS. 1 and 4) may specify other criteria, such as a particular value for, format for, or source of, the persistent source value. In some embodiments, the value of the persistent source value may be used to control permissions granted to an entity that assumes the alternative identifier. For example, an entity may request to assume an alternative identity called TempUserxyz where a policy named PSV_Cust_Policy specifies that the permission for the target storage service is ReadOnly, but that when the persistent source value is set to RoyG44 the TempUserxyz alternative identity is permitted to read and write. In some embodiments, information specified in the policy may be embedded into the credentials that are generated for the requested alternative identity.

In some embodiments, a system may divide functionality for managing temporary and longer-term credentials into different identify management components. For example, a system may implement a long-term identity component or service for creation, management, and/or validation of credentials associated with long-term identities and may implement a separate, short-term identity component or service for creation, management, and/or validation of credentials associated with short-term (e.g., temporary) identities. For example, a user or application may use a first set of credentials to access the system via the long-term identity component as a long-term identity and then assume, via the short-term components, a short-term identity to perform some action that is restricted to that short-term identity. In embodiments, the Identity and Access Management Service is configured to ensure that the persistent source value persists across multiple assumed temporary identities, irrespective of the source of the credentials submitted with the identity-assumption request.

In some embodiments, the Identity and Access Management Service 102 may include an administrative interface (e.g., API, CLI, or GUI) (not illustrated)). In embodiments, for a long-term identity or application to define their persistent source value when assuming a temporary identity, an administrator may grant them permissions for the action. In addition, while granting the permissions, the administrator can use conditions to control what the long-term identity or application sets as its persistent source value.

Figure 2:
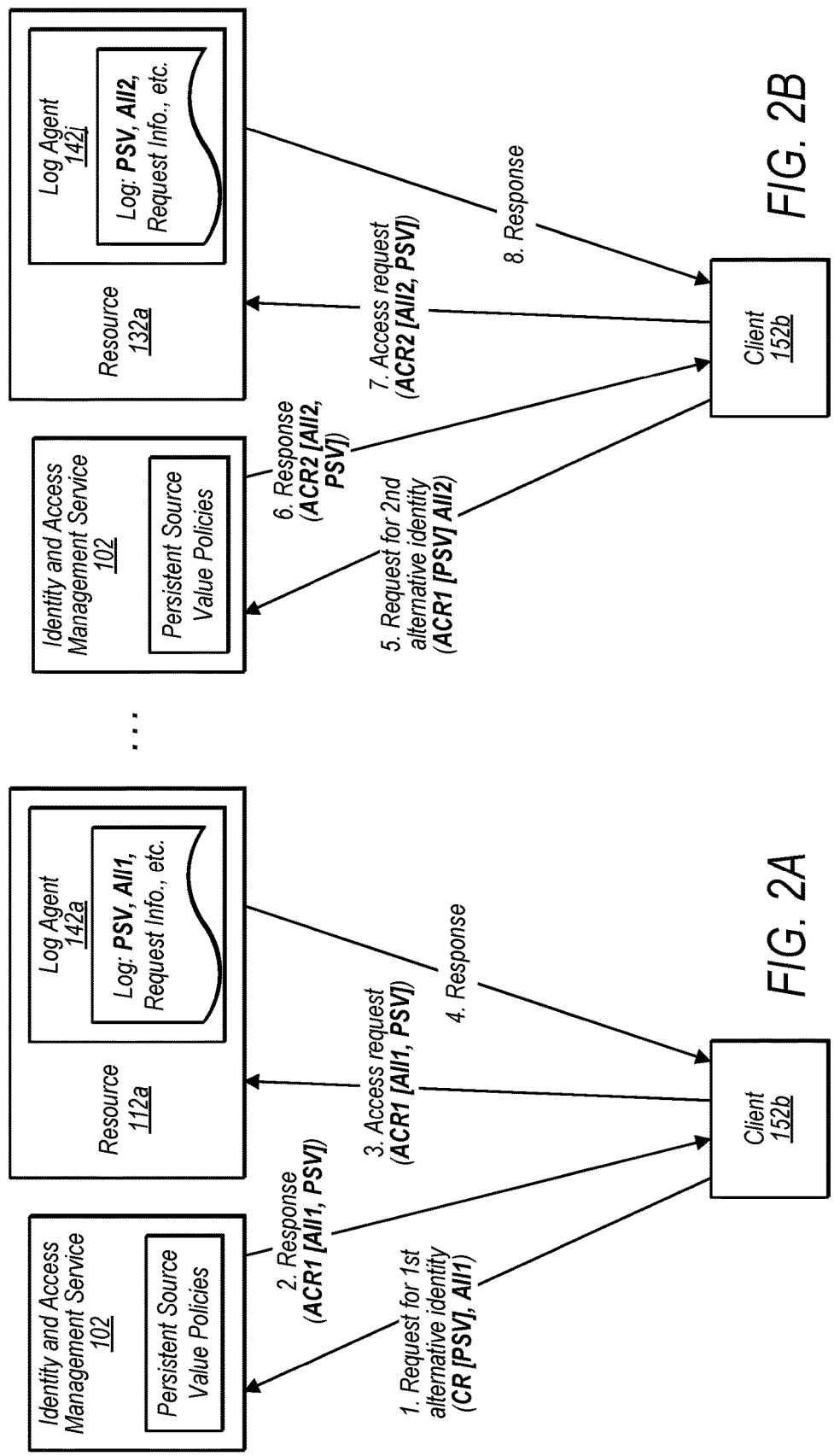
FIGS. 2A and 2B are combined block diagram/data flow diagrams illustrating architectures and techniques for implementing persistent source values for assumed alternative identities, according to some embodiments.

FIGS. 2A and 2B are combined block diagram/data flow diagrams illustrating a technique for implementing persistent source values for assumed alternative identities, according to some embodiments. FIGS. 2A and 2B, together, illustrate an example of identity chaining. In embodiments, FIGS. 2A and 2B, taken together illustrate a transitive property of the persistent source value (e.g., PSV applies between successive assumptions of identities).

As illustrated at step 1 in FIG. 2A, client 152b generates and sends a request for a first alternative identity to Identity and Access Management Service 102. The illustrated request includes credentials (CR) associated with the current identity of the requesting entity (these may be long-term or alternative credentials associated with a long-term or alternative identity, in various embodiments), the current credentials of the entity include (indicated by the square brackets) the persistent source value (PSV) and the request indicates the identity identifier for the requested (first) alternative identity (AII1).

In the illustrated embodiment, the Identity and Access Management Service 102 processes the request, validating the credentials, and processing the request in accordance with a persistent source value policy (e.g., determining whether use of the alternative identity is authorized, whether the persistent source value is required or has to confirm to a particular format, etc.). For the case where the credentials are authenticated and the assumption of the alternative identity permitted, the Identity and Access Management Service 102 generates a response (transmitted in step 2) that includes credentials for the first alternative identity (ACR1) the generated credentials including an identity identifier for the first alternative identity (AII1) and a copy of the persistent source value (PSV) that appeared in the requests in step 1. In step 2, the Identity and Access Management Service 102 responds to the client request in step 1 with the generated response (e.g., responds with a token that includes the first alternative identity (AII1) and a copy of the persistent source value (PSV)).

FIG. 2A goes on to illustrate the at Step 3 the client 152b transmits an access request to a resource (e.g., Resource 112a). The access request includes credentials including an identity identifier for the first alternative identity (AII1) and a copy of the persistent source value (PSV). In the illustrated embodiment, the resource processes the request, and a logging agent at the resource (e.g., Log Agent 142a) logs information about the request including at least the identity identifier for the first alternative identity (AII1) and a copy of the persistent source value (PSV). The Resource 112a generates a response, and transmits the response (Step 4). The ellipsis between FIGS. 2A and 2B illustrate that time goes on in-between FIGS. 2A, 2B.

In FIG. 2B the same client 152b makes a request to assume yet another alternative identity. This time, the request (Step 5) is for a second alternative identity (AII2) is made using the credentials for the first alternative identity assumed in FIG. 2A (ACR1) that include the same PSV that has been persisted via steps 1-2. The Identity and Access Management Service 102 process the request (e.g., based on a persistent source value policy) and generates a response with the requested credentials (ACR2) that include the second alternative identity AII2 and the persisted PSV.

FIG. 2B illustrates client 152b using the credentials for the second alternative identity (ACR2) to make a data access request, this time of Resource 132a (of a Database Service 130). The resource 132a processes the request and transmits back a response (step 8). Log agent 142j generates a log about the request, indicating at least the second alternative identity. FIG. 2B illustrates that the PSV from FIG. 2A, (the one in step 1) is persisted through multiple identity assumptions and access requests, and ultimately ends up in a log that associates the PSV with an access request performed under some other (alternative) identity than the identity used in step. 1.

In embodiments, when an entity assumes multiple alternative identities in a session (also known as identity or role chaining) the persistent source value remains the same for all alternative identities that are assumed in the session. In embodiments, the Identity and Access Management Service 102 will not permit modification to the persistent source value when an entity assumes yet another alternative identity within the session. In embodiments, the Identity and Access Management Service 102 will deny the assume-alternativeidentity request for attempts to modify the persistent source value when assuming another alternative identity in an existing assume alternative identity session.

FIGS. 2A/2B are illustrated with client 152*b* originating the alternative identity requests and the requests sent to resources, but the process is similar for other clients such as external client(s) 152*a* and client 152*c*.

FIGS. 2A/2B illustrate the persistent source value and alternative identity identifiers as being included in the credentials (in an encrypted form in a token, for example). It is contemplated that the persistent source value and alternative identity identifiers may be passed as part of the request, but not necessarily within the credentials part of the request, in embodiments.

In some embodiments (e.g., embodiments implemented with session tokens) the persistent source value is in the session token, for example, the session token being used for every action performed by the alternative identity, including assumption of yet another alternative identity. Passing a session token may be a required part of assuming an alternative identity, in embodiments. In some embodiments, the session token may be encrypted and the target resource that receives the encrypted session token may send the token to an authentication service that decrypts the token, extracts the persistent source value and populates the authentication results with the decrypted persistent source value.

In embodiments, a request to assume an alternative identity, like step 1 in FIG. 2A, may be implemented via various APIs, such as, but not limited to a custom AssumeIdentity API, a SAML-based AssumeIdentity API, and a WebIdentity-based AssumeIdentity API. Example parameters included with the request include, but are not limited to, a value for the persistent source value parameter (PSV), an identifier of the alternative identity being requested, and credentials of the identity making the request. Prior to calling an AssumeIdentity API, an administrator may grant permissions for setting the persistent source value. An example sample permission an administrator can grant is to assume a developer identity, on the condition that the developer set the developers long-term identity username as the persistent source value.

In embodiments, the administrator uses an identity condition to enforce setting a long-term identity username as the persistent source value when the developer identity is assumed. The administrator can also use the condition to define the acceptable source identity values such as: a known value like a long-term identity username or a predefined list of values to select from (e.g., some roles may be limited to use by a listed group of entities). The administrator can also enforce these or similar conditions in the identity trust policy of any alternative identity they own. For example, if two users, Connor and Doug are the only users allowed to assume an identity (specified by conditions in a policy), an attempt to set the persistent source value to some other value than Connor or Doug would cause the attempt to assume the identity to fail.

In another example, a persistent source value policy may specify that the persistent source value must be in a format this is some combination of information, such as, but not limited to, username-profectID. Using the example above, in combination with the TempIT1234 temporary identity identifier in FIG. 4 (describe below), the persistent source value name would be Connor-TroubleTicket3914, for example. The required characteristics of the persistent source value may be set by conditions set out in a policy, for example.

In yet another example, statement in a policy (e.g., conditional statements) may be used to specify permissions based on the persistent source value. FIG. 4, described below provides examples. For example, a policy for a given resource or a policy for a given identity might reference the persistent source value attribute.

It is contemplated that the credentials CR in FIG. 2A may be credentials that are part of a Security Assertion Markup Language (SAML) based protocol or a federated identity protocol, in various embodiments. The credentials CR in FIG. 2A may originate at an Identity Provider 180 that is external to the Service Provider Network 100, in embodiments. For example, Client 172 in FIG. 2A may log-in to Identity Provider 180 (or an active directory broker of an enterprise client network and ask for a SAML assertion and then use the SAML assertion to request a temporary identity (FIG. 2A, step 1), etc. In embodiments, an attribute in the SAML assertion (entered by the provider of the SAML assertion) or input from the requesting entity (e.g., as specified or required by a policy, for example) or a requesting client server application identity may be used as the persistent source value (PSV) in the request in step 1. It is contemplated that Identity Provider 180 may be implemented on a client network, such as client network, in some embodiments.

In at least some embodiments, the persistent source value may automatically be set by the Identity and Access Management Service 102 (e.g., be set to the requesting entities long-term username or some policy-specified attribute, or the like). In some embodiments, the owner of the temporary identity may specify whether the persistent source value is a requirement for assuming that temporary identity (e.g., may specify in a policy, or otherwise) and/or may specify requirement for what is an allowable entry from the persistent source value. In some embodiments, the owner of the temporary identity may specify that the persistent source value is not allowed for assuming that temporary identity (e.g., may be specified in a policy, or otherwise).

In embodiments, credentials (e.g., sometimes referred to as a token) for an assumed identity (FIG. 2*a*, step 2) are generated based on at least three features: an access key ID, a session token, and a secrete key (the secret key is used to sign the token that is generated based on the access key ID and the session token; the secret key is not sent as part of the token). The session token may include the persistent source value, in embodiments. For example, the persistent source value may be a field in the session token. Upon receipt of a request made using the encrypted credentials and targeting a resource of a service, the targeted resource or service may pass the encrypted credentials to an authentication service that decrypts and validates the credentials, extracts that persistent source value and passes the decrypted persistent source value back to the target resource in the authentication response, where a log record associated with the request and including the persistent source value may be generated for actions associated with the request. In embodiments, the temporary identity session name is distinct from the persistent source value.

In FIG. 2B, client 172 makes a request (step 5) for a second alternative identity. The request includes alternative credentials for the first alternative identity (ACR1), an identity identifier for the first identity (AII1) and the persistent source value (PSV). In some embodiments, when the receiving Identity and Access Management Service 102 receives the request, it may recognize the persistent source value field in the request and persist the value in that field in further alternative credentials for that session (e.g., whether a persistent source value is required or not, in embodiments). If the incoming request (step 5) includes a persistent source value and an attempt is made to set the persistent source value for the requested alternative identity to some other value, the request may be refused and an error message generated, for example (e.g., the system may prevent persistent source values from being changed within a session as various alternative identities are assumed).

In some embodiments, even if a persistent source value policy does not specify that a persistent source value is necessary to obtain the requested alternative identity or is required to be included in the credentials for the requested alternative identity, the system may still embed (or otherwise include) a value provided for the persistent source value in the credentials for the requested alternative identity. Such proactive "stickiness" of a value across one or more alternative identities (e.g., a sticky, transient identifier), even when not required by a policy, may keep the value "alive" or in process such that the value remains available for a subsequent alternative identity associated with a persistent source value policy that does specify that a persistent source value is necessary to obtain the requested alternative identity or is required to be included in the credentials for the requested alternative identity, in embodiments.

FIG. 2A does not specify whether the credentials for the current identity (Step 1) are long-term or short-term credentials. The credentials for the current identity may be of either type, in embodiments. The credentials for the current identity may be generated at any of a number of different sources. For example, the credentials for the current identity illustrated in FIG. 2A may have been generated by the Identity and Access Management Service 202, or may have been generated by an Identity Provider 180 (FIG. 1) external to the Service Provider Network 100. For example, the credentials for the current identity may have been generated by a third-party identity provider or by an identity provider service of a client network (e.g., part of a client network, not illustrated). In embodiments, an identity provider may implement a long-term credentials service and a separate alternative credentials service for providing distinct types of credentials.

In embodiments, once the alternative developer identity is assumed and the persistent source value set, the Identity and Access Management Service 102 will not allow changes to the persistent source value, for the duration of the assumed identity session. Attempts to change the persistent source value at this point may results in an error message and/or denial of the request altogether, in embodiments. The Identity and Access Management Service 102 will carry along the persistent source value for any action perform with the alternative identity and for when yet another alternative identity is assumed within the existing assumed identity session.

In some embodiments (not illustrated) instead of transmitting the PSV in the credentials as in steps 2, 3, 6, and 7 of FIG. 2A/B, the Identity and Access Management Service 102 may store the PSV. The stored PSV may be used when requests are made to resources. For example, the client may obtain the PSV from the Identity and Access Management Service 102 when generating a request to be sent to the target resources. In some embodiments the client may generate a request indicating the location of the stored PSV and the target resource may obtain the PSV from the Identity and Access Management Service 102.

Figure 3:
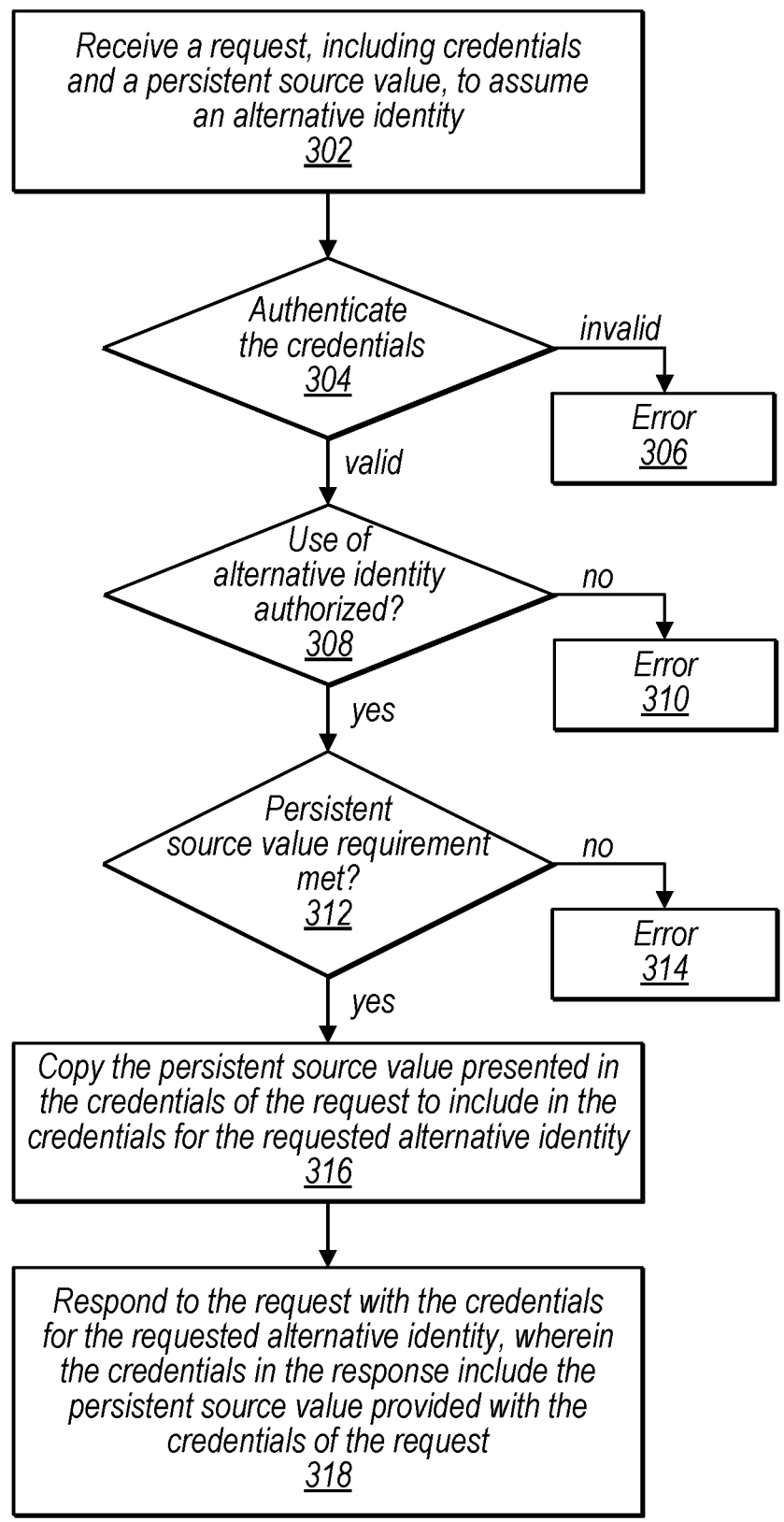
FIG. 3 is a flow chart that illustrates a technique for processing requests for temporary identities in a system that implements persistent source values for assumed alternative identities, according to some embodiments.

FIG. 3 is a flow chart that illustrates a technique for processing requests for alternative identities in a system that implements persistent source values for assumed alternative identities, according to some embodiments. At least some of the steps illustrated in FIG. 3 are similar to steps illustrated in FIGS. 2A/2B and may be performed by entities such as those illustrated in FIGS. 1 and 2A/2B.

At block 302, a request to assume an alternative identity, the request including credentials and a persistent source value, is received, by Identity Manager 104, from a client 152, for example. The request may include either of long-term or alternative credentials for a corresponding long-term or alternative identity, in embodiments. The credentials are authenticated (block 304). For example, either the Identity Manager 104 may directly authenticate the credentials, or the Identity Manager 104 may send the credentials (encrypted) to an authentication/authorization service to be authenticated and the authentication service may return one or more decrypted values from the decrypted credentials back to the Identity Manager 104. The authentication at step 304 may be a cryptographic-based validation—not persistent source value policy-based validation, in some embodiments. For a failed authentication (e.g., invalid credentials) an error may be generated and an error response transmitted (block, 306). For example, an authentication failure response message may be generated and sent.

For valid credentials (block 308) the Identity Manager 104 may check whether use of the requested alternative identity is authorized. For example, the Identity Manager 104 may retrieve one or more policies associated with the requested alternative identity and determine the authorization from statements (e.g., conditional statements or the like) in the corresponding policy. Access control lists are also an example implementation for determine whether use of the alternative identity is authorized in block 308, in embodiments. If use of the alternative identity is not authorized (block 308, no) an error may be generated and transmitted (block 310). For example, an authorization error may be generated and sent. In embodiments, the error may be logged (e.g., by logging agents 142*a*-*n*, as described below).

In some embodiments, the Identity Manager 104 may check one or more policies to determine authorization as well as other permissions/requirements. Block 312 illustrates that a persistent source value requirement may be checked. For example, FIG. 1 illustrates that for alternative identifier AltDev123, the persistent source value (PSV) is set to Required. In the example, the Identity Manager 104 determines that the PSV is required to be provided for the requested identity (based on the PSV requirement specified in the policy) and looks for the value in the request (e.g., step 1 and 5 in FIGS. 2A/2B). If the value has been provided, the persistent value requirement is met (312, yes). If the PSV is not provided (312, no) (or if the format does not match a format specification in the policy) an error may be generated, logged and/or transmitted (block 314). For example, an error stating that a persistent source value is required may be generated and sent. With regard to errors 306, 310 and 314, in some high security systems, the request may be denied without providing a reason for the denial, in embodiments.

For a PSV requirement that has been met, the Identity Manager 104 may copy the persistent source value presented in the credentials of the request to include the credentials for the requested alternative identity (block 318), and respond to the request with the credentials for the requested alternative identity, wherein the credentials in the response include the persistent source value provided with the credentials in the request (block 318), similar to steps 2 and 6 in FIGS. 2A/2B.

FIG. 4 is a table illustrating various characteristics of a persistent source value policy for a system that implements persistent source values for assumed alternative identities, according to some embodiments. The table illustrated in FIG. 4 is a more detailed view of the table in FIG. 1, in embodiments.

As explained above, a system may implement various types of policies. FIG. 4 illustrates a particular type of those policies, a persistent source value policy. It is contemplated that other types of policies may include attributes, fields, or other characteristics similar to those illustrated in FIG. 4, without departing from the scope of the disclosure. The table illustrates a mapping of alternative and temporary identity identifiers (across the top) to persistent source value policies (Policy Name row), and various features of the example policies (e.g., target resource, permissions, etc.).

The first persistent source value policy (TempDev123) is an example, of a policy that specifies permissions for developers to access a Database Service (e.g., Database Service 130). The permissions for the assumed identity are Read/Write and the policy has another Permissions Statement that limits the Read/Write permission to the developer database Dev_Database, in particular. The policy specifies the duration of the alternative identity (here, 4 hours).

The next persistent source value policy (AltSvcxyz) is an example, of a policy that specifies permissions for services (e.g., applications or other programmatic clients) to access a Storage Service (e.g., Storage Service 120). The target resource is StorageResourcexyz and the write permission is specified. This policy has another Permissions Statement that prevents assuming other identities from this identity, in particular. The policy specifies the duration of the alternative identity (here, 24 hours) and the persistent source value requirement is optional.

The next persistent source value policy (TempUserxyz) is an example, of a policy for a customer that specifies permissions for a storage service (e.g., Storage Service 120) with the ReadOnly permission generally specified. Also, the policy specifies a value for permissions based on the persistent source value (when the persistent source value in the request is set to "RoyG44" Read/Write is permitted for the target storage service. Also, this policy specifies that the persistent source value (PSV) must be set to the username field of the long-term credentials.

Persistent source value policy TempIT234 is an example, of a policy for an administrator that specifies full permissions for a compute service (e.g., Compute Service 110, or an event-driven, serverless computing service, etc.). The policy specifies that the PSV must be in the format "username-TroubleTicketNo" that identifies not only the username for the long-term credentials used to assume the temporary identity, but also an identifier of a project that user is working on—a trouble ticket.

Policies, such as those described herein may include other permission statements. In an example, the information in a statement is contained within a series of elements. A version element may specify the version of the policy language. The statement policy element may be used as a container for other elements. It may be possible to include more than one statement in a policy. Examples of the other elements include, but are not limited to statement identifier (to differentiate between statements), an effect element (indicates whether the policy allows or denies access), action (a list of actions that the policy allows or denies), resource (e.g., a list of resources to which the actions apply).

In some embodiments, a system may implement a number of policies. For example, one policy may specify whether a requesting entity is authorized to assume the identity associated with the policy, and another policy may specify permissions associated with the assumed identity. Either type of policy may be related to the persistent source value, in embodiments. For example, a requesting entity (a client entity receiving input from a user or a programmatic entity) may or may not be allowed to assume an identity based on whether a value is provided for the persistent source value. In another example, only entities that provide the admin value as the persistent source value are allowed to have configuration-type access to a target resource.

In embodiments, permissions only scope down for assumed alternative identities. In other embodiments, permissions do not necessarily scope down for assumed alternative identities and may be independently-determined on an identity by identity basis.

Figure 5:
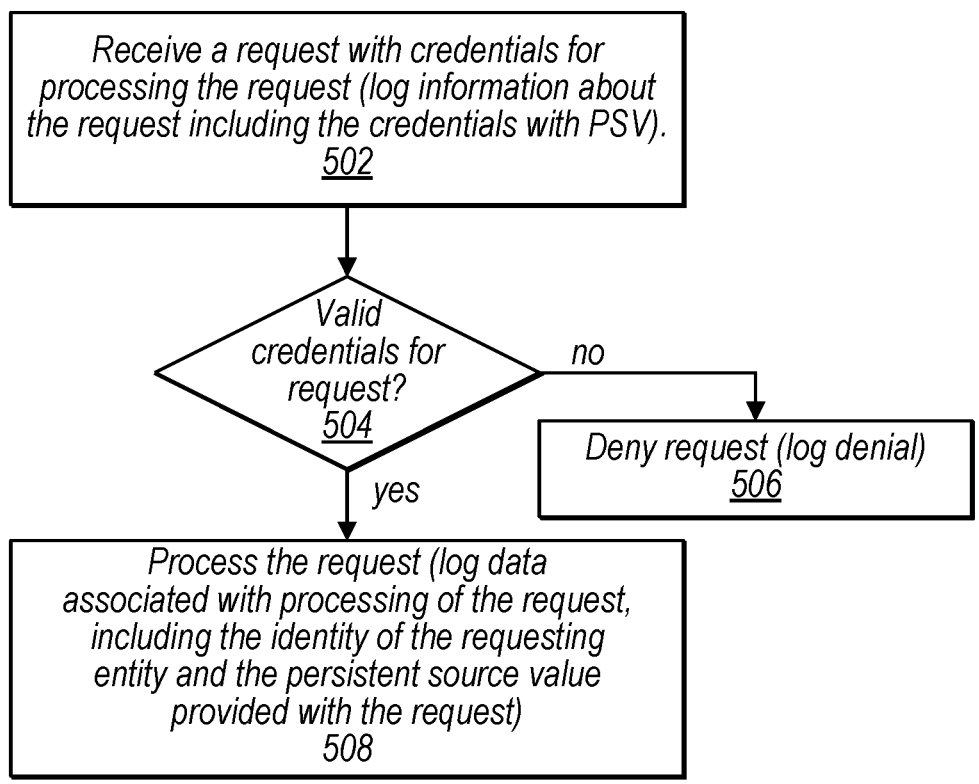
FIG. 5 is a flow chart that illustrates a technique for processing requests made via a temporary identity in a system that implements persistent source values for assumed alternative identities, according to some embodiments.

FIG. 5 is a flow chart that illustrates a technique for processing requests made via an alternative identity in a system that implements persistent source values for assumed alternative identities, according to some embodiments. The illustrated process may be performed by various resources and logging agents of services 110, 120, 130, in embodiments.

At block 502, a request is received with credentials for processing the request. For example, steps 3 and 7 in FIGS. 2A/2B illustrate a resource of a service receiving the request. Information about the request is logged. For example, information about the request, such as, but not limited to, the identity of the requesting entity and the persistent source value provided with the request may be logged by a logging agent (e.g., logging agents 142*a*, 142*j*). At block 504, validity of the credentials for the request are checked. If the credentials are invalid (block 504, no) the request is denied, and information about the denial logged (e.g., information about the request, such as, but not limited to, the reason for the denial, the alternative identity of the requesting entity, and the persistent source value provided with the request may be logged).

In embodiments, when a persistent source value is specified while assuming an alternative identity, a logging component (e.g., a logging agent for the target resource) will include the persistent source value in the log details captured for actions performed using the assumed alternative identity. When an action on a resource is performed with the assumed alternative identity, the persistent source value is placed in a section of the log details, in embodiments. For example, when the persistent source value is set for an assumed alternative identity, a log viewer component may display the persistent source value in the parameters section of the log details.

Figure 6:
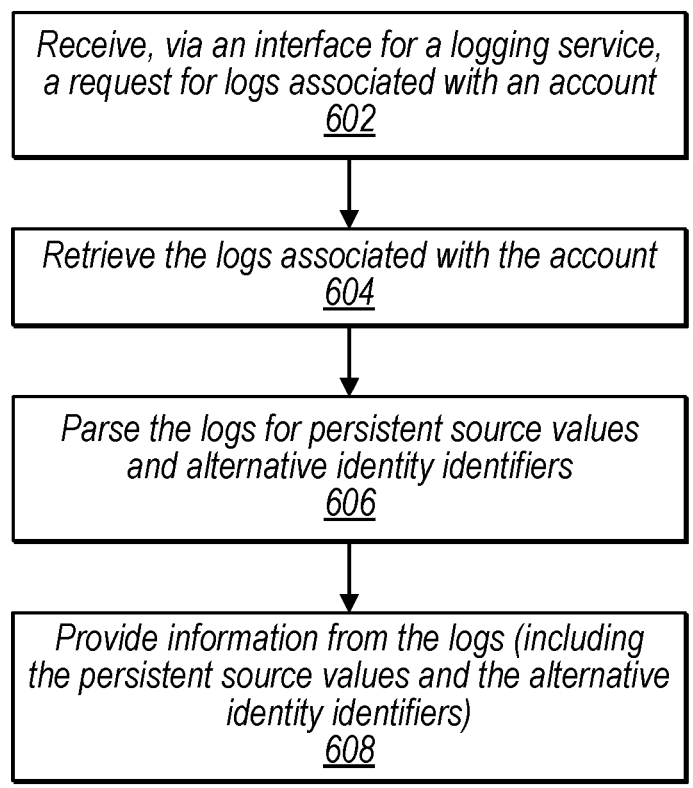
FIG. 6 is a flow chart the illustrates a technique for obtaining persistent source values from logs, according to some embodiments.

FIG. 6 is a flow chart the illustrates a technique for obtaining persistent source values from logs, according to some embodiments. The illustrated functionality may be performed via an interface (e.g., Log Viewer 144) of the Logging Service 140, in embodiments.

At block 602, a request for logs associated with an account is received via an interface for a logging service. The logs associated with the account are retrieved (block 604) and then parsed for persistent source values and alternative identity identifiers (block 606). The information from the logs is provided via the interface, the provided information including information about the request, the persistent source values and/or the alternative identity identifiers (block 608) in embodiments.

In embodiments, components of the Log Viewer 144 may include components that provide views of access requests by the persistent source value (as opposed to queries or presentations created based on long-term or alternative credentials). Various systems may provide configurable settings, selectable to cause displayed log information to be organized based on the persistent source value. In embodiments, views of logs of particular access requests provide the persistent source value from the log.

The Log Viewer 144 is not necessarily the only way to obtain the persistent source values from the logs. It is contemplated that some systems may implement various APIs (APIs that access the logging system) or code that facilitate an application other than the Logging Service obtaining and presenting information from the logs.

In embodiments, the log records for a first account may include a persistent source value indicating a long-term user-id from some other, second account, the log records for the first account being otherwise unavailable to the second account.

Although particular functionality is depicted for the sake a clarity, other functionality for obtaining the logged persistent source values associated with particular requests are contemplated. For example, a console or the like may provide interface elements for querying the logs.

Example Computer System

Figure 7:
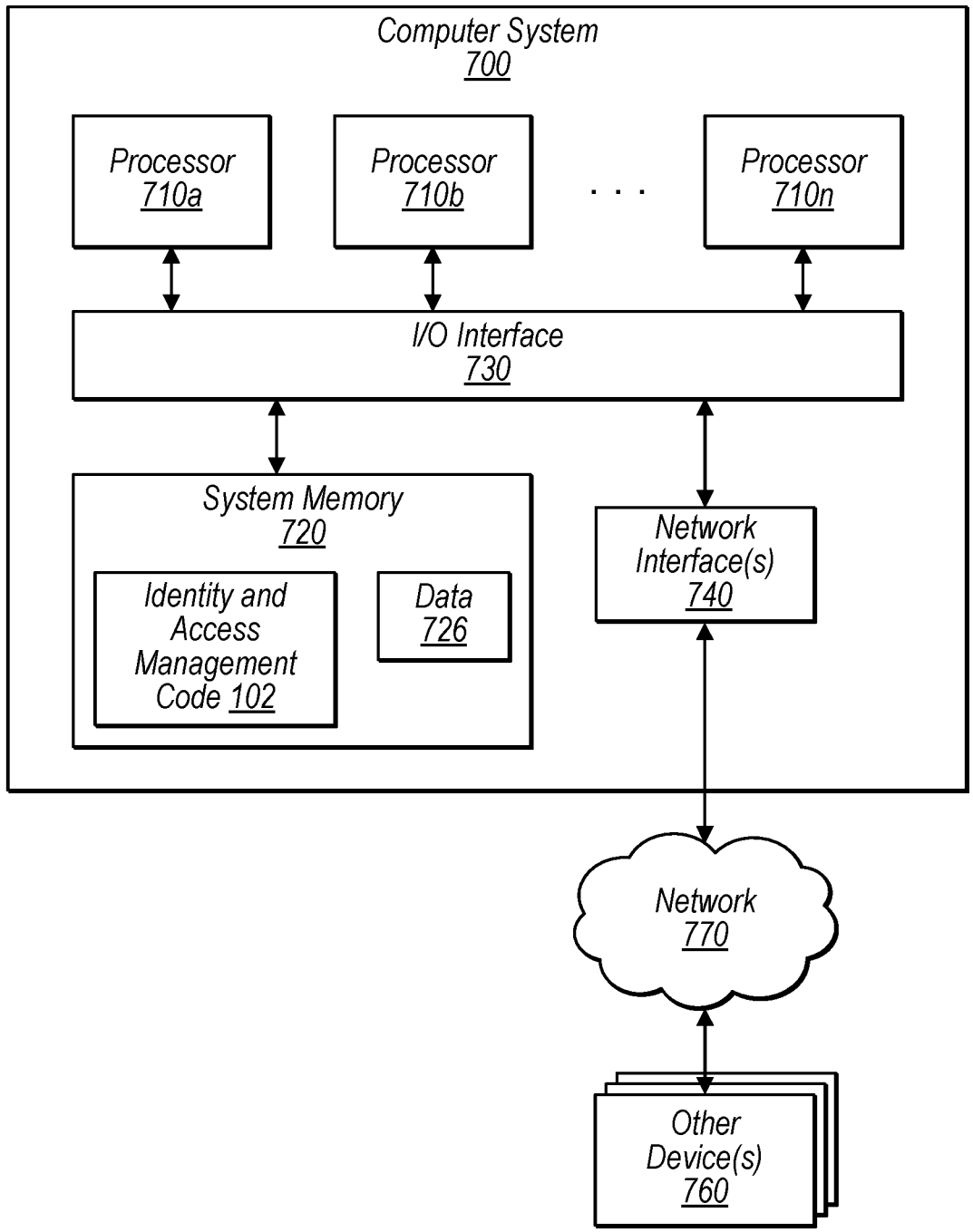
FIG. 7 illustrates an example of a computer system, one or more of which may implement various components described and illustrated throughout the disclosure, including components of a system that implements persistent source values for assumed alternative identities, according to embodiments.

FIG. 7 illustrates an example of a computer system, one or more of which may implement various components described and illustrated throughout the disclosure, including one or more components that implement an Identity and Access Management Service that implements persistent source values for assumed alternative identities, according to embodiments.

Various portions of systems in FIGS. 1, 2A/2B and 7 and/or methods presented in FIGS. 3, 5 and 6, described herein, may be executed on one or more computer systems similar to that described herein, which may interact with various other devices of the system.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 760, such as cursor control device, keyboard, audio device, and display(s). In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for an Identity and Access Management Service that implements persistent source values for assumed alternative identities may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for an Identity and Access Management Service that implements persistent source values for assumed alternative identities, are shown stored within system memory 720 as Identity and Access Management code 102 and data 726 (e.g., the policies, etc.), respectively. In other embodiments, program instructions and/or data may be received, sent, or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740. Program instructions may include instructions for implementing the techniques described with respect to any of the FIGS.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 700 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 820 may include program instructions (e.g., such as code 824), configured to implement embodiments of an Identity and Access Management Service that implements persistent source values for assumed alternative identities as described herein, and data storage 726, comprising various data accessible by the program instructions 724. In one embodiment, program instructions 724 may include software elements of a method illustrated in the above figures. Data storage 726 may include data that may be used in embodiments described herein. In other embodiments, other or different software elements and/or data may be included.

Those skilled in the art will appreciate that computer system 700 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., persistent source values for assumed alternative identities) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

What is claimed is:

1. A system, comprising:
a plurality of computers comprising processors and memory configured to implement one or more services of a service provider network that provide access to hosted resources;
one or more processors and memory configured to implement an identity manager configured to:
receive a request from a client to assume a temporary identity, the request comprising:
current credentials for a current identity for the client, the current credentials including a persistent source value; and
an identifier of the temporary identity;
generate, based on validation of the current credentials, a first credentials for the temporary identity, wherein the first credentials include the identifier of the temporary identity and the persistent source value; and send, to the client, the first credentials that include the identifier of the temporary identity and the persistent source value copied from the request;
a computer of the plurality of computers hosting a given one of the resources and a logging agent, the computer configured to:
receive an access request for the given resource and comprising the first credentials;
process, based on validation of the first credentials, the access request; and
log information associated with the access request, wherein the log information includes the identifier of the temporary identity and the persistent source value.

2. The system of claim 1,
wherein the identity manager is configured to:
receive another request from the client to assume a second temporary identity, the other request comprising:
the first credentials for the first temporary identity for the client, the first credentials including the persistent source value;
generate, based on validation of the first credentials, a second credentials for the second temporary identity, wherein the second credentials include an identifier of the second temporary identity and the persistent source value; and
respond to the request with the second credentials that include the identifier of the second temporary identity and the persistent source value copied from the other request.

3. The system of claim 1,
wherein the services of the service provider network that provide access to hosted resources comprise an event-driven, serverless computing service and a compute service; and
wherein the request is received from, and the response is transmitted to, a programmatic process hosted by one or more resources of the storage service or the compute service.

4. The system of claim 1, further comprising:
a datastore storing policies that specify permissions associated with or requirements for, respective persistent source values;
wherein said generate the second credentials for the temporary identity is based at least in part on the specified permissions or requirements for, the persistent source value specified in a corresponding one of the stored policies.

5. A method, comprising:
performing by one or more computing devices:
generating, by an identity manager in response to a request from a requesting client to assume an alternative identity, the request comprising an identifier of and first credentials for a current identity for the requesting client and a persistent source value, a first credentials for the alternative identity, wherein the first credentials include an identifier of the alternative identity and the persistent source value;
sending, to the requesting client, the first credentials that include the identifier of the alternative identity and the persistent source value copied from the request; and
persisting the persistent source value for a subsequent identity assumption by the requesting client.

6. The method of claim 5, further comprising:
determining, in response to another request to assume a second alternative identity and based at least in part on a corresponding policy that specifies requirements for a persistent source value in the other request, whether a persistent source value has been included in the other request; and
generating, based on the other request including the persistent source value, a second credentials for the second alternative identity, wherein generating the second credentials comprises copying the persistent source value from the other request to the second credentials.

7. The method of claim 5, further comprising:
in response to another request for another alternative identity, the other request comprising second credentials and an identifier for the other alternative identity:
authenticating the second credentials; and
identifying, based on an identifier for the other alternative identity, a policy for the other alternative identity;
determining, based on the policy, that one or more requirements for the persistent source value have been met; and
generating, based on the determination that the one or more requirements have been met,
third credentials for the other alternative identity, the third credentials comprising the persistent source value copied from the request for the other alternative identity.

8. The method of claim 7, wherein said authenticating the second credentials comprises:
transmitting the second credentials to an authentication service, the transmitted second credentials comprising an encrypted persistent source value from the other request; and
receiving a response to the authentication request, the response including the decrypted persistent source value from the other request.

9. The method of claim 5, further comprising:
retrieving from a data store, in response to another request to assume another alternative identity, a policy that corresponds to the other alternative identity, wherein the stored policy comprises:
a policy name,
one or more target resources or services,
specification of whether a persistent source value is required for the other alternative identity,
specification of a format for the persistent source value, and
one or more permissions for accessing the one or more target resources or services using the other alternative identity,
determining, based on the policy, to grant the other request; and
responding to the other request with credentials for the other requested alternative identity, wherein the credentials include the persistent source value according to the format specified in the policy.

10. The method of claim 5,
wherein the services of the service provider network that provide access to hosted resources comprise a storage service and a compute service; and
wherein the request is received from, and the response is transmitted to, a programmatic process hosted by one or more resources of the storage service or the compute service.

11. The method of claim 5, further comprising:
storing, to a data store, policies that specify permissions associated with or requirements for, persistent source value attributes for credentials for temporary identities;
receiving, via an administrative interface for configuring the policies, specification of a persistent source value requirement that requires the identity manager to perform:
 extracting the persistent source value from credentials supplied in a request for a respective alternative identity; and
 copying the extracted persistent source value to credentials for the requested alternative identity.

12. The method of claim 5, further comprising:
receiving, by a computer hosting a resource and a logging agent, an access request for the resource, the access request comprising the first credentials and the persistent source value;
processing, by the computer, based on validation of the first credentials, the access request; and
logging, by the logging agent of the computer, information associated with the access request, wherein the log information includes the identifier of the alternative identity and the persistent source value.

13. The method of claim 5, further comprising:
receiving another request from the requesting client to assume a second alternative identity, the other request comprising:
 the first credentials for the first identity for the requesting client, the first credentials including the persistent source value;
generating, based on validation of the first credentials, a second credentials for the second alternative identity, wherein the second credentials include an identifier of the second alternative identity and the persistent source value; and
responding to the request with the second credentials that include the identifier of the second alternative identity and the persistent source value copied from the other request.

14. One or more non-transitory computer-readable storage media storing program instructions that when executed on or across one or more processors cause the one or more processors to implement an identity manager configured to perform:
generating, by an identity manager in response to a request from a requesting client to assume an alternative identity, the request comprising an identifier of and first credentials for a current identity for the requesting client and a persistent source value, a first credentials for the alternative identity, wherein the first credentials include an identifier of the alternative identity and the persistent source value;
sending, to the requesting client, the first credentials that include the identifier of the alternative identity and the persistent source value copied from the request; and
persisting the persistent source value for a subsequent identity assumption by the requesting client.

15. The one or more non-transitory computer-readable storage media of claim 14, wherein the program instructions configure the identity manager to perform:
determining, in response to another request to assume a second alternative identity and based at least in part on a corresponding policy that specifies requirements for a persistent source value in the other request, whether a persistent source value has been included in the other request; and
generating, based on the other request including the persistent source value, a second credentials for the second alternative identity, wherein generating the second credentials comprises copying the persistent source value from the other request to the second credentials.

16. The one or more non-transitory computer-readable storage media of claim 14, wherein the program instructions configure the identity manager to perform:
in response to another request for another alternative identity, the other request comprising second credentials and an identifier for the other alternative identity:
 authenticating the second credentials; and
 identifying, based on an identifier for the other alternative identity, a policy for the other alternative identity;
 determining, based on the policy, that one or more requirements for the persistent source value have been met; and
 generating, based on the determination that the one or more requirements have been met,
  third credentials for the other alternative identity, the third credentials comprising the persistent source value copied from the request for the other alternative identity.

17. The one or more non-transitory computer-readable storage media of claim 14, wherein to perform said authenticating the second credentials the program instructions configure the identity manager to perform:
transmitting the second credentials to an authentication service, the transmitted second credentials comprising an encrypted persistent source value from the other request; and
receiving a response to the authentication request, the response including the decrypted persistent source value from the other request.

18. The one or more non-transitory computer-readable storage media of claim 14, wherein the program instructions configure the identity manager to perform:
retrieving from a data store, in response to another request to assume another alternative identity, a policy that corresponds to the other alternative identity, wherein the stored policy comprises:
 a policy name,
 one or more target resources or services,
 specification of whether a persistent source value is required for the other alternative identity,
 specification of a format for the persistent source value, and
 one or more permissions for accessing the one or more target resources or services using the other alternative identity;
determining, based on the policy, to grant the other request; and
responding to the other request with credentials for the other requested alternative identity, wherein the credentials include the persistent source value according to the format specified in the policy.

19. The one or more non-transitory computer-readable storage media of claim 14, wherein the program instructions configure the identity manager to perform:
storing, to a data store, policies that specify permissions associated with or requirements for, persistent source value attributes for credentials for alternative identities;
receiving, via an administrative interface for configuring the policies, specification of a persistent source value requirement that requires the identity manager to perform:

extracting the persistent source value from credentials supplied in a request for a respective alternative identity; and copying the extracted persistent source value to credentials for the requested alternative identity.

20. The one or more non-transitory computer-readable storage media of claim 14, wherein the program instructions configure the identity manager to perform:

receiving another request from the requesting client to assume a second alternative identity, the other request comprising:

the first credentials for the first identity for the requesting client, the first credentials including the persistent source value;

generating, based on validation of the first credentials, a second credentials for the second alternative identity, wherein the second credentials include an identifier of the second alternative identity and the persistent source value; and responding to the request with the second credentials that include the identifier of the second alternative identity and the persistent source value copied from the other request.

\* \* \* \* \*